3,040,045
NEW PROCESS FOR THE PREPARATION OF A YELLOW TRIAZINE VAT DYE

Robert C. Conn, Bound Brook, and James M. Campbell, Fanwood, N.J., assignors to American Cyanamid Company, New York, N.Y., a corporation of Maine
No Drawing. Filed Oct. 12, 1959, Ser. No. 845,613
3 Claims. (Cl. 260—249)

This invention relates to an improvement in the process for the manufacture of a vat dye. More specifically, this invention relates to an improvement in the preparation of 2,4 - bis(1-anthraquinonylamino)-6-phenoxy-s-triazine by the reaction of two moles of 1-aminoanthraquinone with cyanuric chloride, followed by condensation of the intermediate 2,4-bis(1-anthraquinonylamino)-6-chloro-s-triazine with phenol, the said condensation being carried out in nitrobenzene solution, which comprises inclusion in the reaction mixture during the said condensation with phenol 0.1 to 1.0 parts, per part of said bisanthraquinonylaminochlorotriazine present, of a non-ionic surface active agent comprising essentially esters of polyoxyethylene with acids selected from the group consisting of long chain fatty acids, long chain unsaturated fatty acids and mixtures of these with rosin acids.

The vat dye of the structure

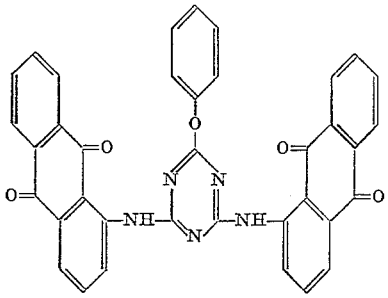

is a yellow vat dye of highly desirable shades and superior fastness properties and the textile industry has found it to be an important color. This dye is manufactured commercially by a step-wise condensation of cyanuric chloride with 1-aminoanthraquinone and phenol. The first step consists of the reaction of two moles of 1-aminoanthraquinone with cyanuric chloride in nitrobenzene solution. The resultant 2,4-bis(1-anthraquinonylamino)-6-chloro-s-triazine is then condensed with phenol in nitrobenzene solution in the presence of a caustic such as sodium hydroxide or potassium hydroxide. This synthesis has, up to now, always been run as two separate steps, although they can both be carried out in the same solvent. The reason for this has been that if the reaction mixture from the first condensation is then treated with caustic and phenol the reaction mixture becomes viscous and unstirrable. The thick mixture not only cannot be stirred, but tends to decompose and the entire mixture is unworkable. Consequently, it is necessary that the intermediate mono-chlorotriazine derivative be isolated and then reintroduced into nitrobenzene for the condensation with phenol in the presence of caustic. This of course leads to added costs of manufacture. The epitome of all multi-step syntheses is to carry out all steps successively without isolation, if possible.

We have found, that it is possible to carry out this synthesis without isolation of the intermediate monochlorotriazine derivative if there is added to the reaction mixture resulting from the condensation with a mono-aminoanthraquinone, a non-ionic surface active agent of the polyoxyethylene fatty acid ester class as defined below. This addition can be carried out simultaneously with or before or after the addition of the required phenol and caustic. If the addition is after the caustic and phenol, the non-ionic surface active agent must be added promptly and care must be taken to avoid extensive heating before the surface active agent is added. It is consequently, preferable to add it simultaneously with or before the other reagents. By the use of such a non-ionic surface active agent, it is possible to complete the preparation of the yellow vat dye without isolating the intermediate mono-chlorotriazine derivative.

It is an advantage of our invention that this procedure results in considerable and practical savings in the manipulation and handling of materials. Instead of two batches of spent solvent to be recovered there is only one. The time of isolation and the labor involved in the isolation are saved. Furthermore, additional equipment is not needed.

The surface active agents which may be used in our invention must be of the polyethylene oxide fatty acid ester type. The fatty acids which can be used include rosin acids and any of the common saturated and unsaturated aliphatic acids of carbon chains greater than 12 carbons, such as lauric, myristic, palmitic, stearic, oleic, elaidic, linoleic, ricinoleic, erucic, brassidic acids and the like. Most of these occur naturally in various fats, usually as mixtures, and may be used in the preparation of the surface active agents, either as such mixtures of acids without separation into individual components or as the pure acid. Especially useful for our invention are the surface active agents derived from tall oil, which is a mixture of acids such as oleic, ricinoleic, linoleic and the like with rosin acids. Agents prepared from tall oil exhibit greater thermal and chemical stability and, hence, are preferred. The surface active agent is prepared either by direct reaction with ethylene oxide or by esterification of the acids by polyethylene glycols. The properties of the surface active agent will vary with the number of oxyethylene units in the molecule. Agents prepared from the various acids and having polyethylene oxide chains of from 2 to 60 ethylene oxide units may be used in this invention to achieve the desired effect. Preferably, however, an average of about 16 polyethylene oxide units should be present to achieve the best advantages of our invention.

The amount of surface active agent to be used in our improved process may range from 0.1 to 1.0 parts of non-ionic surface active agents per part of the mono-chlorotriazine intermediate in the reaction mixture. For practical purposes it is preferred to use about 0.5 parts.

Our invention can be illustrated by the following examples in which parts are by weight unless otherwise specified.

Example 1

To 445 g. nitrobenzene is added 43.2 g. alpha-aminoanthraquinone and 18.9 g. cyanuric chloride. The mixture is heated with stirring to 110° C. over about 1 hour and then to 155° C. in about 2 to 3 hours. After holding the mixture at 155–160° C. for about 3½ hours, it is cooled to room temperature. Air is passed through the entire mixture until it is completely free of hydrogen chloride.

To this reaction mixture is added 24 g. of a polyoxyethylene ester of tall oil containing an average of 16 oxyethylene units, 12.6 g. phenol and 10.8 g. 50% caustic soda solution. The resulting slurry is heated uniformly to 155–160° C. in about 4 hours and then held at 155 to 160° C. for an additional 3 hours. After cooling to room temperature, the solid product is isolated by filtration, washed with nitrobenzene, and then steam stripped free of nitrobenzene. The dye product is isolated by filtration and washing. It is equivalent to the product obtained when an isolated intermediate is used.

Example 2

Example 1 is repeated except that the non-ionic surface active agent is omitted. The reaction mixture becomes so thick and unmanageable after the temperature reaches 110° C. that the reaction mixture must be discarded because it decomposes on the walls of the reaction vessel.

Example 3

A procedure similar to that described in Example 1 is used except that 48 g. of the non-ionic surface active agent instead of 24 g. is used, and the phenol is mixed with the sodium hydroxide before introduction into the reaction mixture. Results similar to those described in Example 1 are obtained.

Example 4

The procedure of Example 1 is followed except that only 5 g. of the non-ionic surface active agent is used. The reaction mixture is somewhat more viscous than in Example 2, but the mixture is still workable and the dye product is obtained in satisfactory yield and quality.

Example 5

The procedure of Example 1 is followed using an ester of tall oil from a polyoxyethylene of 2-oxyethylene units. The results obtained are similar to those of Example 1.

Similarly, when an ester of tall oil from a polyoxyethylene of 30 oxyethylene units or a polyoxyethylene palmitate averaging 15 oxyethylene units is used in place of the surface active agent used in Example 1, a similar result is obtained.

We claim:

1. In the preparation of 2,4-bis(1-anthraquinonylamino)-6-phenoxy-s-triazine by a process in which two moles of 1-aminoanthraquinone are reacted with cyanuric chloride in nitrobenzene solution to produce a first reaction mixture containing resultant intermediate 2,4-bis(1-anthraquinonylamino)-6-chloro-s-triazine, and said intermediate is subsequently subjected to condensation with phenol in the presence of caustic, the improvement which comprises; adding to said first reaction mixture, for each part by weight of said intermediate present therein, from about 0.1 to about 1.0 parts by weight of a non-ionic surface active agent comprising essentially polyoxyethylene esters of acids selected from the group consisting of long chain fatty acids, long chain unsaturated aliphatic acids and mixtures of these with rosin acids; then adding to so-treated reaction mixture said phenol and said caustic; then conducting said condensation in the resultant mixture and collecting the resultant dye.

2. The improvement of claim 1 in which the source of the fatty acids used to form the surface active agent is tall oil.

3. The improvement of claim 2 in which the polyoxyethylene chain of the surface active agent averages about 16 oxyethylene units.

References Cited in the file of this patent

UNITED STATES PATENTS

| | | |
|---|---|---|
| 2,373,826 | Graham | Apr. 17, 1945 |
| 2,770,622 | Gorton et al. | Nov. 13, 1956 |
| 2,820,032 | Hill et al. | Jan. 14, 1958 |
| 2,911,337 | Uhlenbroek et al. | Nov. 3, 1959 |
| 2,923,614 | Gysin et al. | Feb. 2, 1960 |

FOREIGN PATENTS

| | | |
|---|---|---|
| 390,201 | Germany | Feb. 14, 1924 |

OTHER REFERENCES

Schwartz et al.: "Surface Active Agents and Detergents," vol. II, page 714, Interscience Publishers Inc., N.Y., 1958.